United States Patent
Aikawa et al.

(10) Patent No.: US 6,652,651 B2
(45) Date of Patent: Nov. 25, 2003

(54) METHOD OF SURFACE TREATMENT FOR LENS OF VEHICLE LAMP

(75) Inventors: Shinji Aikawa, Shizuoka (JP); Koichi Nakamura, Shizuoka (JP); Hidetaka Anma, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 10/209,595

(22) Filed: Jul. 31, 2002

(65) Prior Publication Data

US 2002/0192384 A1 Dec. 19, 2002

Related U.S. Application Data

(62) Division of application No. 09/464,186, filed on Dec. 16, 1999.

(30) Foreign Application Priority Data

Dec. 17, 1998 (JP) ............................................ 10-359003

(51) Int. Cl.⁷ ............................................. B05B 15/04
(52) U.S. Cl. .................... 118/301; 118/314; 427/374.1; 427/421
(58) Field of Search ................................ 118/719, 721, 118/301, 314, 326; 427/374.1, 372.2, 384–386, 421

(56) References Cited

U.S. PATENT DOCUMENTS

| | | | | |
|---|---|---|---|---|
| 4,985,722 A | * | 1/1991 | Ushijima et al. | 396/624 |
| 5,665,814 A | * | 9/1997 | Lewis et al. | 524/588 |
| 5,985,420 A | * | 11/1999 | Haga et al. | 428/212 |
| 6,059,434 A | * | 5/2000 | Murakoshi et al. | 362/510 |
| 6,113,694 A | * | 9/2000 | Davis | 118/663 |
| 6,217,202 B1 | * | 4/2001 | Kageyama et al. | 362/516 |

FOREIGN PATENT DOCUMENTS

| | | | |
|---|---|---|---|
| DE | 2 358 124 | | 5/1974 |
| DE | 40 17 341 A1 | | 12/1991 |
| DE | 42 12 831 A1 | | 10/1993 |
| EP | 0 913 714 A1 | | 6/1999 |
| JP | Hei 10-158420 | | 6/1998 |
| JP | Hei 10-172306 | | 6/1998 |
| JP | 09008517 | * | 8/1998 |

* cited by examiner

Primary Examiner—Richard Crispino
Assistant Examiner—Michelle A Lazor
(74) Attorney, Agent, or Firm—Fish & Richardson P.C.

(57) ABSTRACT

A method of surface treatment for a lens of a vehicle lamp. The method comprises forming a hard coating film on a outer surface of the lens by heating to harden after the hard coating film is applied onto the outer surface of the lens; cooling the lens formed with the hard coating film until the inner surface of the lens has a predetermined temperature; and forming a antifogging coating film on a inner surface of the lens by heating to dry after the antifogging coating film is applied onto the inner surface of the lens.

2 Claims, 8 Drawing Sheets

METHOD OF SURFACE TREATMENT FOR LENS OF VEHICLE LAMP

CROSS-RRFERENCE TO RELATED APPLICATIONS

This application is a divisional and claims priority from U.S. patent application Ser. No. 09/464,186, filed on Dec. 16, 1999.

BACKGROUND OF THE INVENTION

1. Field of the Invention

This invention relates to a vehicle lamp having a plastic lens and more particularly to a method for surface treatment of its lens.

2. Description of the Related Art

Transparent lenses or equivalents are now employed in vehicle lamps such as headlamps. However, such a lens becomes fogged with only a few waterdrops sticking to its inner surface and this poses a serious problem in view of its external appearance as quality. Consequently, it has heretofore been contrived to obtain a lens whose inner surface is formed with an antifogging coating film.

In recent years, plastic lenses are increasingly adopted in vehicle lamps such as headlamps. This is because the plastic lenses are lightweight and excellent in shock resistance in comparison with glass lenses; however, as the plastic lenses are poor in scratch resistance, weather resistance and solvent resistance, hard coating films are often formed on their outer surfaces.

From the fact stated above, it is desirable to form antifogging coating films on the inner surfaces and hard coating films on the outer surfaces of transparent lenses or equivalents made of plastic that are adopted as vehicle lamps.

However, the following problem will be posed when it is attempted to form the antifogging coating film and the hard coating film in an offhand manner with the adoption of the aforementioned arrangement.

More specifically, when the hard coating film or the antifogging coating film is formed, a backing jig is employed in order to support a lens. However, as shown in FIG. 8, if the hard coat film is formed after the antifogging coating film is formed, there are high possibility that that a lens 6 is scratched because the backing jig 4 may come in contact with the outer surface 6a of the lens 6.

SUMMARY OF THE INVENTION

An object of the present invention made in view of the aforementioned circumstances is to provide a method for surface treatment of a lens of a vehicle lamp so that an antifogging coating film may be formed without scratching the lens when the antifogging coating film is formed on the inner surface of the plastic lens when a hard coating film is formed on the outer surface thereof.

The present invention is intended to accomplish the object above by implementing a method for surface treatment of a lens through the steps carried out in the following proper order.

The method according to the present invention comprises forming a hard coating film on a outer surface of the lens by heating to harden after the hard coating film is applied onto the outer surface of the lens; cooling the lens formed with the hard coating film until the inner surface of the lens has a predetermined temperature; and forming a antifogging coating film on a inner surface of the lens by heating to dry after the antifogging coating film is applied onto the inner surface of the lens.

The "antifogging coating film" may be formed on the whole or part of the inner surface of the lens as long as the film forming range includes a target range where the lens may become fogged.

The "hard coating film" may be formed on the whole or part of the outer surface of the lens as long as the film forming range includes a target range where the scratching of the lens and weather and solvent resistance should be avoided.

As shown in the arrangement above, since the hard coating film is formed before the antifogging coating film is formed according to the present invention, the presence of the hard coating film can prevent the lens from being scratched even though a backing jig is brought into contact with the outer surface of the lens when the antifogging coating film is formed.

Therefore, according to the present invention, the antifogging coating film is formable without scratching the lens even in a case where the antifogging coating film is formed on the inner surface and the hard coating film is formed on the outer surface of the plastic lens.

As the antifogging coating film is formed on the inner surface of the lens according to the present invention, even if a transparent lens or an equivalent is used, the surface-active action of the antifogging coating film prevents poor external appearance that waterdrops sticks to the inner surface of the lens and becomes a water film so that the lens fogs up. On the other hand, the formation of the hard coating film on the outer surface of the lens can improve scratch resistance, weather resistance and solvent resistance of the lens.

Lens elements may or may not be formed on the inner surface of the "lens." In the latter case, however, as the lens looks foggy even with a few waterdrops sticking thereto, the adoption of the arrangement according to the present invention is specifically effective.

Although the steps of forming the hard coating film, cooling the lens and forming the antifogging coating film constituting a method for surface treatment of the lens may be conducted in different places, the following working effect is achievable by carrying out the whole step in the same clean.

When the aforementioned steps are performed in entirely different places, the number of physical distribution man-hours would be increased to that extent and while the lens formed with the hard coating film is conveyed up to a place where the antifogging coating film is formed, there is the possibility that the lens may be soiled with dirt or scratched. Moreover, the moisture in the air is absorbed by the lens before the antifogging coating film is formed and a whitening phenomenon may occur during the step of forming the antifogging coating film. In other words, since the antifogging coating is hydrophilic, the moisture absorbed into the lens is introduced into the antifogging coating film in the form of waterdrops immediately after the application of the coating and then the moisture in the antifogging coating film is caused to evaporate by heat-drying, so that traces of waterdrops remain to exist. Consequently, there may occur the whitening phenomenon in that the antifogging coating film looks whitish.

On the contrary, performing the whole step mentioned above within the same clean room not only reduces the number of man-hours but also prevents the lens from being soiled and scratched during the conveyance of the lens and also prevents the whitening phenomenon of the antifogging coating film from occurring.

With the arrangement above, the "predetermined temperature" is not restricted to a specific one as long as it is lower than the temperature immediately after hardening by heating during the step of forming the hard coating film. However, setting the inner surface of the lens at temperatures higher than the room temperature of the clean room makes possible the application of the antifogging coating film while the dried condition of the lens is maintained after the heat-hardening process during the step of forming the hard coating film. It is thus prevented to allow the occurrence of the whitening phenomenon in which the lens absorbs the moisture in the air before the coating is applied.

On the other hand, setting the "predetermined temperature" too high causes a phenomenon in which the antifogging coating film is not uniformly formed over the whole area of the antifogging coating film forming area on the inner surface of the lens because the solvent content in the coating is volatilized previously after the antifogging coating film is applied (unsatisfactory leveling). Consequently, it is preferred to set the predetermined temperature at 35° C. or lower.

A method of cooling the lens up to the "predetermined temperature" during the aforementioned cooling step is not restricted in particular but may be what is adoptable in cooling the lens by forcibly blowing cooled air or air thereagainst or by natural cooling depending on the working conditions.

Incidentally, the thickness of the antifogging coating film is also not restricted in particular but may preferably be set at 10 μm or less for the reason stated below.

Although the antifogging coating film demonstrates its antifogging function whether it is thin or thick, making it too thick needs to apply the coating a plurality of times or prolong the coating discharge time and this results in increasing working time and cost for extra coating, preventing the coating from dripping or necessitating long coating crosslinking time. On the contrary, setting the thickness of the antifogging coating film at 10 μm or less could solve these problems completely or to some extent.

The time interval between the completion of application of the coating and the commencement of the heat-drying process during the step of forming the antifogging coating film may preferably be set shorter in view of preventing the moisture in the air from being absorbed into the antifogging coating film on one hand and a certain length of time should be secured to obtain a uniform antifogging coating film on the other; in other words, well-balanced time may be set in consideration of both cases. However, the moisture is readily absorbed into the antifogging coating film as the humidity increases; therefore, it is preferred to shorten the time interval between the completion of application of the coating and the commencement of the heat-drying process stepwise for correcting purposes in response to a rise in temperature within the clean room.

With arrangement above, the heat-drying temperature during the step of forming the antifogging coating film is not restricted in particular but if it is set too high, the difference in thermal expansion coefficient between the hard coating film and the lens may cause the hard coating film to crack, whereas if it is set too low, the antifogging coating film is insufficiently hardened as the coating is not crosslinked, so that its resistance to humidity is not sufficiently secured. Therefore, it is preferred to set the heat-drying temperature at 110–130° C. during the step of forming the antifogging coating film.

DETAILED DESCRIPTION OF THE PREFERRED EMBODIMENT

An embodiment of the invention will now be described with reference to the drawings.

Figure 1:
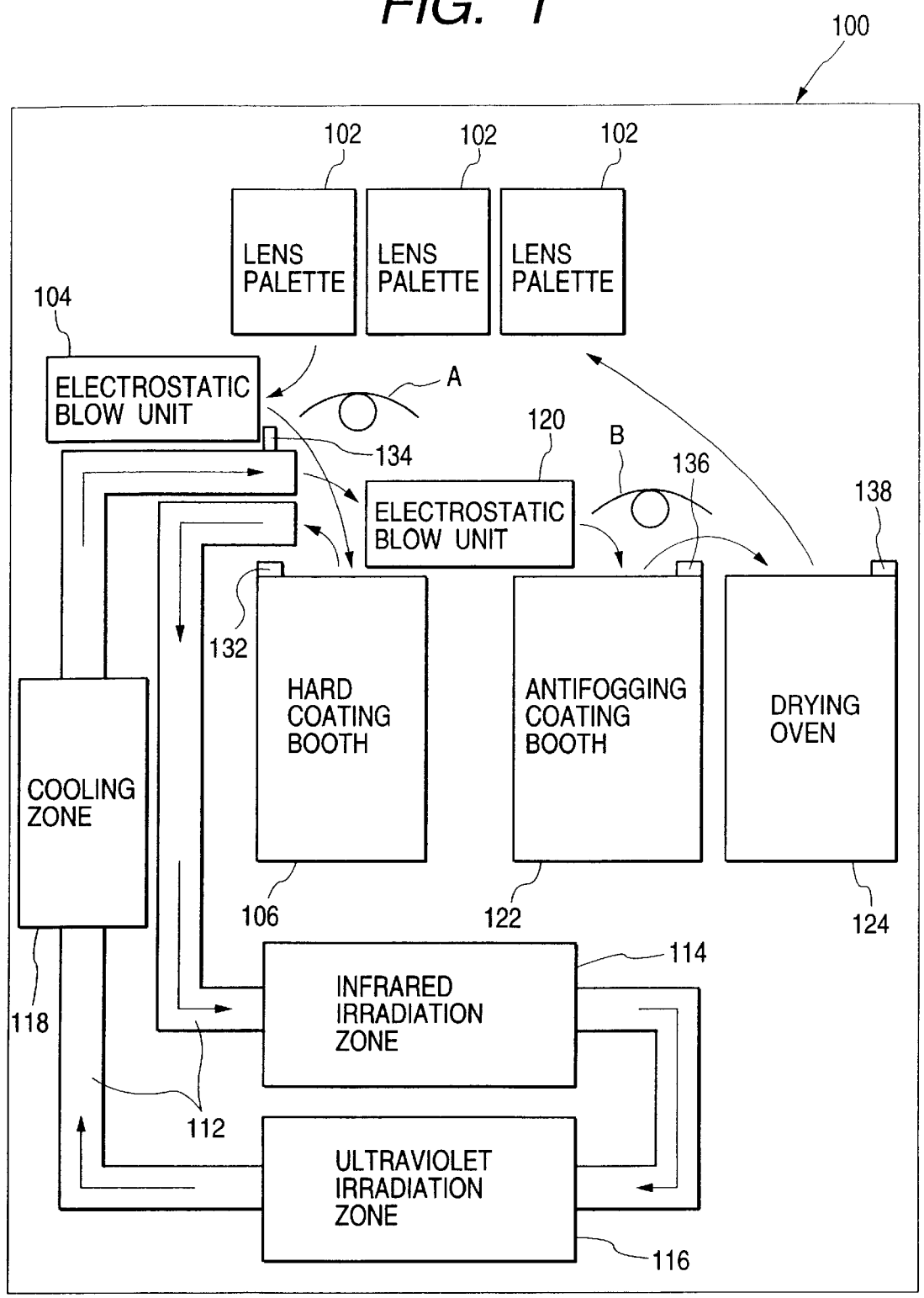
FIG. 1 is a process drawing illustrating a method for surface treatment of a lens of a vehicle lamp as an embodiment of the invention.
Figure 2:
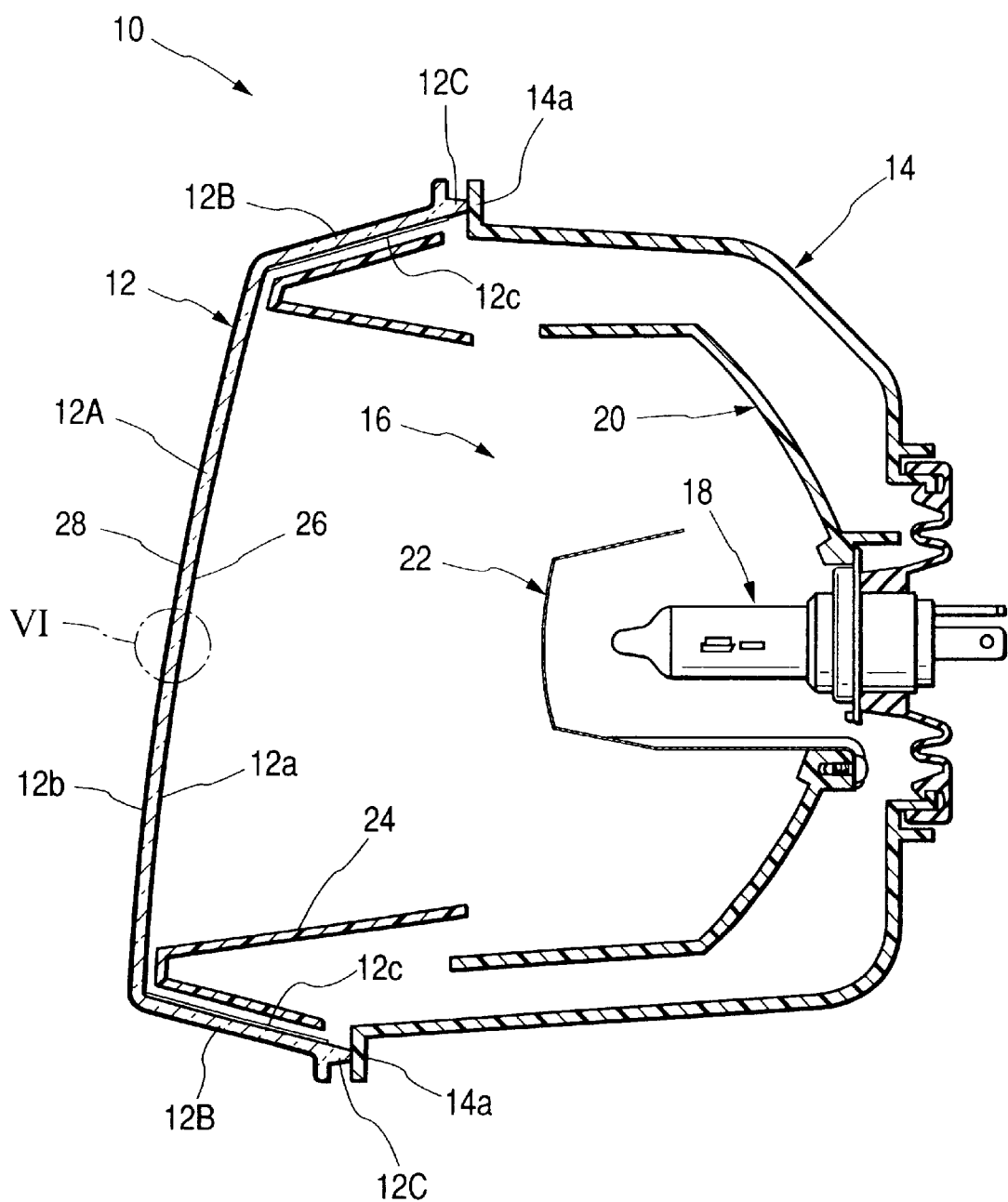
FIG. 2 is a sectional side view of a vehicle lamp having the lens subjected to the method for surface treatment according to this embodiment thereof.

FIG. 1 is a process drawing illustrating a method for surface treatment of a lens of a vehicle lamp as an embodiment of the invention; and FIG. 2, a sectional side view of a vehicle lamp 10 having the lens subjected to the method for surface treatment according to this embodiment thereof.

The construction of the vehicle lamp 10 will be described first before the method for surface treatment of the lens according to this embodiment of the invention is described.

As shown in FIG. 2, this vehicle lamp 10 is a headlamp, wherein a reflector unit 16 including a light source bulb 18, a reflector 20 and a shade 22 is provided in a lamp chamber formed with a lens 12 and a lamp body 14 in such a way that the reflector unit 16 is vertically and laterally tiltable, an extension reflector 24 being provided near the lens 12 in the lamp chamber.

The lens 12 is a plastic lens (made of polycarbonate resin, to be concrete) comprising a transparent lens body portion 12A, a peripheral wall portion 12B formed at the outer peripheral edge of the lens body portion 12A, and a seal leg portion 12C formed at the leading end of the peripheral wall portion 12B. The rear edge face of the seal leg portion 12C of the lens 12 is fitted and fixed by vibration fusion bonding to the front end flange portion 14a of the lamp body 14.

Further, an antifogging coating film 26 is formed over the whole area of the inner surface 12a of the lens body portion 12A of the lens 12, whereas a relief (e.g., knurl, emboss, satin, etc.) 12c is formed over the whole area of the peripheral wall portion 12B. On the other hand, a hard coating film 28 is formed over the whole area of the outer surface 12b of the lens body portion 12A and peripheral wall portion 12B of the lens 12.

The method for surface treatment of the lens according to this embodiment of the invention is a method for forming the antifogging coating film 26 and the hard coating film 28, comprising the steps of forming the hard coating film, cooling the film and forming the antifogging coating film in this order within a clean room 100 as shown in FIG. 1.

(1) Firstly, the step of forming the hard coating film will be described.

This step includes taking the lens 12 out of a lens palette 102, putting the lens 12 in an electrostatic blow unit 104, removing static electricity from the lens 12 by corona discharge, removing alien substances such as dust sticking to the surface of the lens 12 by blowing compressed air thereagainst, putting the lens 12 in a hard coating booth 106, and applying the hard coating film 28 onto the outer surface 12b of the lens 12.

Figure 3A:
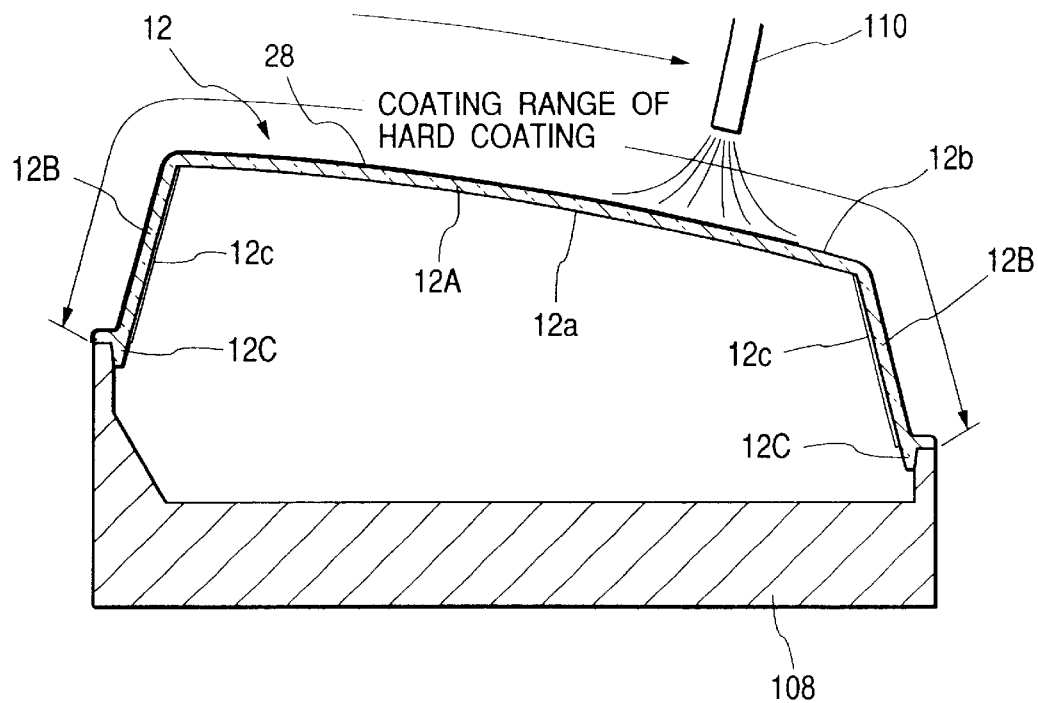
FIG. 3A is a sectional side view showing application of coatings of a hard coating film in the method for surface treatment of a lens.

The application of the hard coating film 28 is carried out through the step including, as shown in FIG. 3A, setting the lens 12 with its outer surface 12b turned upward, moving the nozzle 110 of a spray gun along the outer surface 12b while the seal leg portion 12C is positioned over a backing jig 108 so that the seal leg portion 12C may be brought into contact with the upper end portion of the backing jig 108, and spraying a hard coating from the nozzle 110 onto the outer surface 12b.

The hard coating essentially consists of an ultraviolet hardening synthetic-resin composition and a solvent. As the synthetic-resin composition, a polyfunctional acrylate (acrylic) or silicon series, for example, is used.

Subsequently, the lens 12 coated with the hard coating film 28 is mounted in the upstream end portion of a roller conveying passage 112 whereby to pass the lens 12 through an infrared irradiation zone 114 and an ultraviolet irradiation zone 116 in sequence. The lens 12 is heated by infrared irradiation up to 100° C. or higher in the infrared irradiation zone 114 so as to volatilize the solvent in the coating. In the ultraviolet irradiation zone 116, the synthetic-resin composition in the coating is hardened by ultraviolet irradiation whereby to form the hard coating film 28 thus applied as a film harder than the lens 12.

(2) Subsequently, the step of cooling the film will be described.

This step includes passing the lens 12 mounted in the roller conveying passage 112 through a cooling zone 118 provided on the downstream side of the ultraviolet irradiation zone 116 so as to cool the inner surface 12a of the lens 12 up to 35° C. or lower by blowing cool air or air against the lens 12 by means of a cool-air fan or a air blowing fan. However, an adjustment is made at this time to prevent the temperature of the inner surface 12a from becoming lower than the room temperature in the clean room 100 by cooling.

(3) Subsequently, the step of forming the antifogging coating film will be described.

This step includes removing alien substances from the surface of the lens 12 by putting into an electrostatic blow unit 120 the lens 12 that has been passed through the cooling zone 118 and conveyed up the downstream end portion of the roller conveying passage 112, and then putting the lens 12 in an antifogging coating booth 122 to apply the antifogging coating film 26 onto the inner surface 12a of the lens 12. The thickness of the antifogging coating film 26 is set at 10 $\mu$m or less (e.g., 2–10 $\mu$m).

Figure 3B:
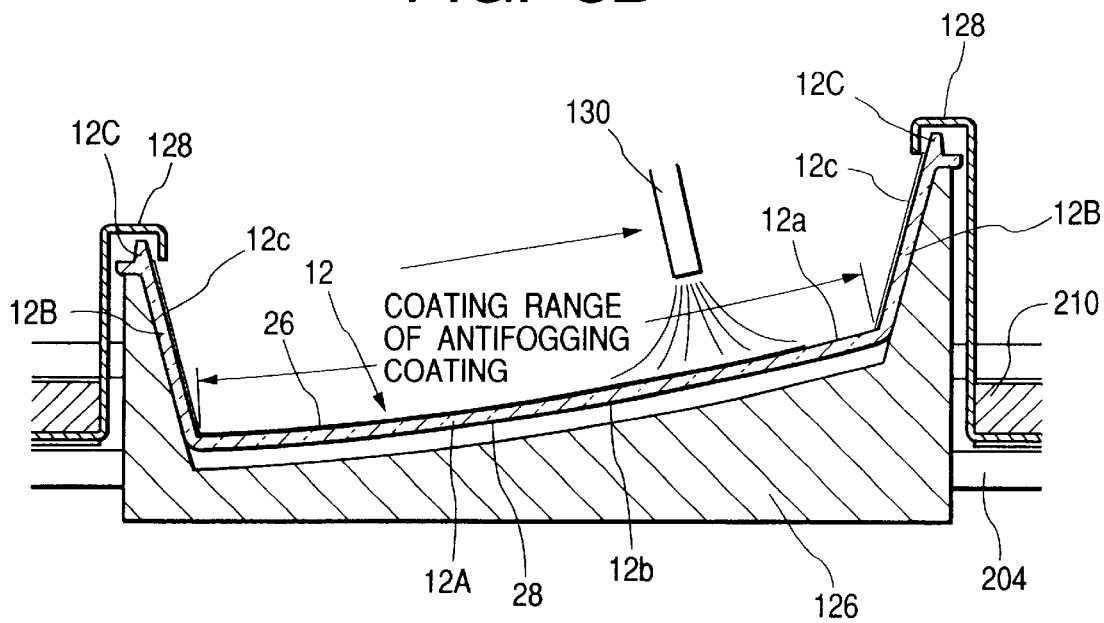
FIG. 3B is a sectional side view showing application of coatings of an antifogging coating film in the method for surface treatment of a lens.

The application of the antifogging coating film 26 is carried out through the step including, as shown in FIG. 3B, setting the lens 12 with its inner surface 12a turned upward, positioning the outer surface 12b over a backing jig 126 having a recessed portion substantially similar in profile to the outer surface 12b so that the outer surface 12b of the peripheral wall portion 12B may be brought into contact with the backing jig 126, moving the nozzle 130 of a spray gun along the inner surface 12a of the lens body portion 12A while the seal leg portion 12C of the lens 12 is covered with a masking jig 128, and spraying an antifogging coating from the nozzle 130 onto the inner surface 12a.

The antifogging coating essentially consists of main, hardening and diluting agents whose workable compounding ratio is set at, for example, 10:1:6–9. The main agent essentially consists of hydrophilic acrylic resin and a surface-active agent, and the hydrophilic acrylic resin is a compound of a hydrophilic portion with a hydrophobic portion sticking to the inner surface 12a of the lens 12.

Subsequently, the lens 12 coated with the antifogging coating film 26 is put in a drying oven 124 so as to dry the antifogging coating film 26 by heating. This process of drying the antifogging coating film 26 by heating is performed at a temperature range of 110–130° C. At this time, it is preferred to maintain the heat-drying temperature for four minutes or longer in view of forming a completely crosslinked coating.

The time interval between the completion of application of the antifogging coating film 26 and the commencement of the heat-drying process is shortened stepwise for the purpose of correction in proportion to a rise in humidity within the clean room 100.

Lastly, the lens 12 subjected to the heat-drying process is taken out of the drying oven 124 before being returned to the lens palette 102.

As shown in FIG. 1, the components within the clean room 100 are laid out so that two operators can do the lens surface treatment work efficiently; namely, an operator A takes charge of the hard coat film forming and cooling steps, whereas an operator B takes charge of the antifogging coating film forming step. Incidentally, on-off switches 132, 134, 136 and 138 are provided in the hard coating booth 106, the roller conveying passage 112, the antifogging coating booth 122 and the drying oven 124, respectively.

Figure 4:
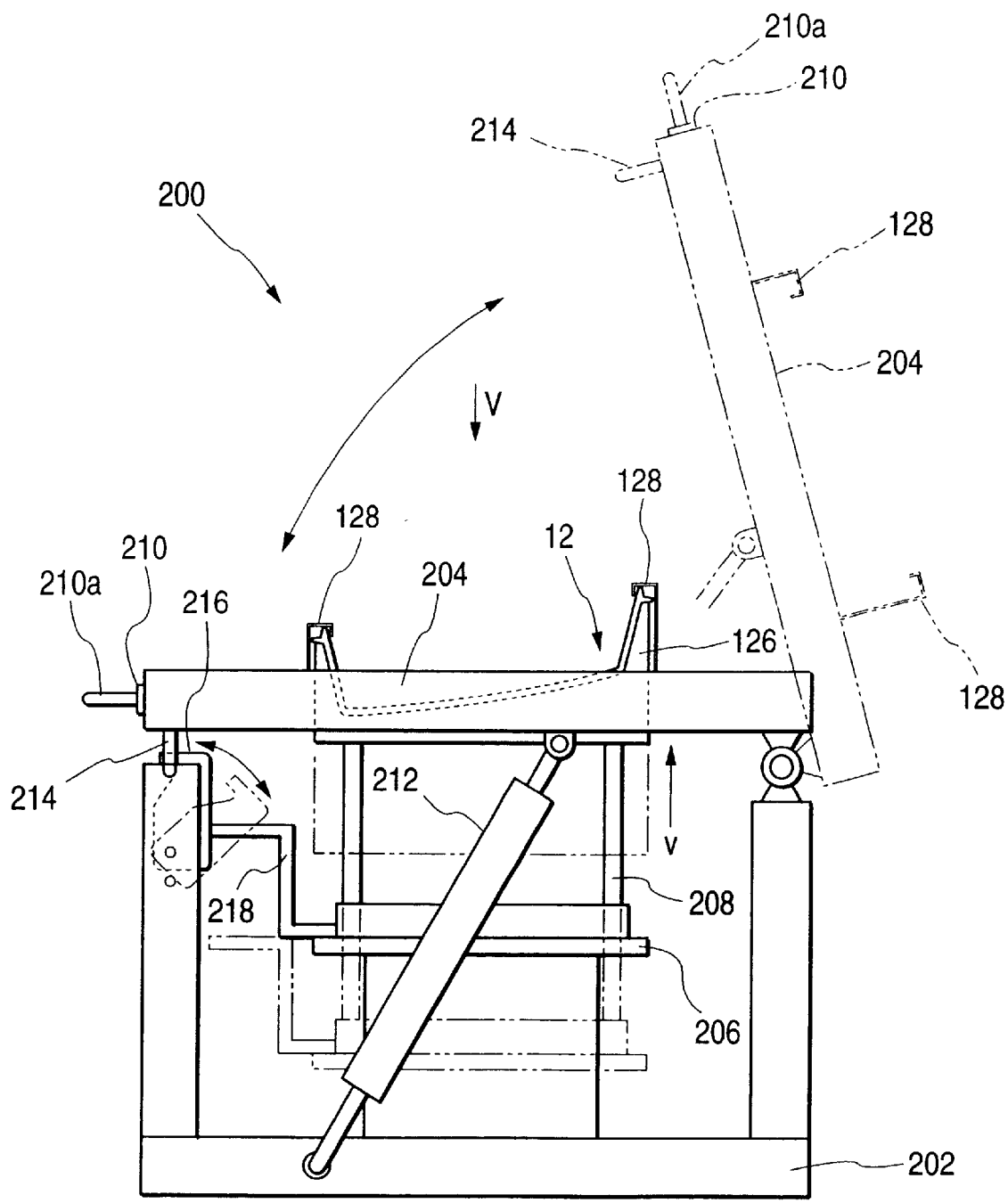
FIG. 4 is a side view of a jig mounting unit for supporting a backing jig and a masking jig used in the anti fogging coating film forming step in the method for surface treatment of a lens.
Figure 5:
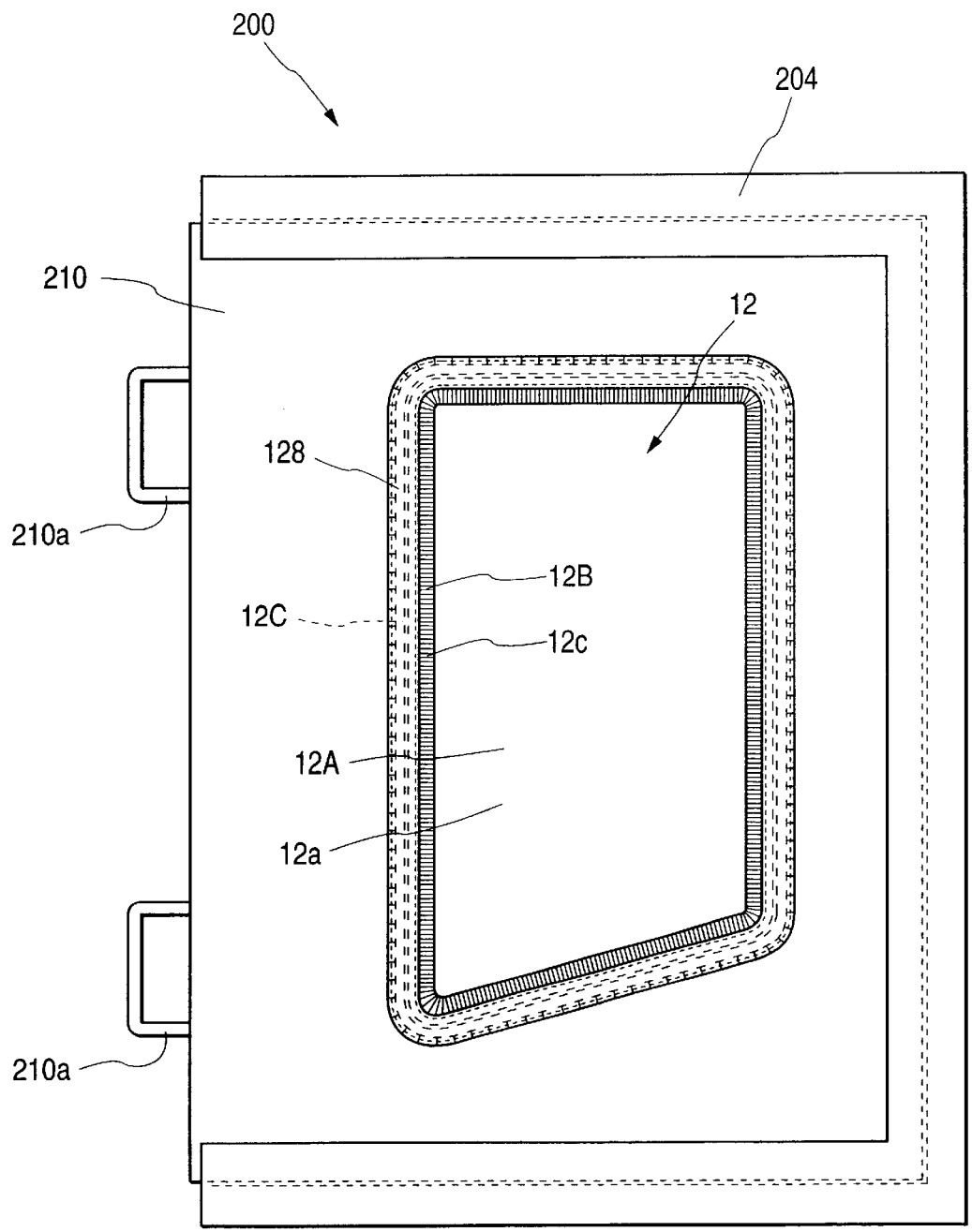
FIG. 5 is a view taken from an arrow V of FIG. 4.

FIG. 4 is a side view of a jig mounting unit 200 for supporting the backing jig 126 and the masking jig 128 used in the antifogging coating film forming step; and FIG. 5, a view taken from an arrow V of FIG. 4.

As shown in FIGS. 4 and 5, the jig mounting unit 200 includes a fixed frame 202, a pivotal frame 204 pivotably supported by the fixed frame 202, and a elevator table 206 ascendably supported by the fixed frame 202.

The backing jig 126 fixedly supported by the support body structure 208 is coupled by pins (not shown) to and fixedly and detachably mounted on the elevator table 206 via the support body structure 208. On the other hand, the masking jig 128 fixedly supported by a support plate 210 is slidably coupled to and fixedly and detachably mounted by pins (not shown) on the pivotal frame 204, whereby to backing jig 126 and the masking jig 128 soiled with the respective coatings can easily be replaced with new ones. In order to facilitate the replacement work further, a pair of grippers 210a are fitted to the support plate 210.

The jig mounting unit 200 is arranged so that when the antifogging coating film 26 is applied, the pivotal frame 204 is first pivoted upward as shown by a chain double-dashed line in FIG. 4 and while the elevator table 206 has been descended, the lens 12 is set on the backing jig 126 so that the outer surface 12b may contact the surface of the recessed portion of the backing jig 126. Then the pivotal frame 204 is pivoted downward and the elevator table 206 is ascended to cover the seal leg portion 12C of the lens 12 with the masking jig 128.

A cylinder 212 drives the pivotal frame 204 to pivot and the elevator table 206 to move up and down (only the cylinder 212 for pivoting the pivotal frame 204 is shown in FIG. 4).

A retaining plate 216 is pivotably mounted on the fixed frame 202. The retaining plate 216 is capable of engaging with a U-shaped retaining bar 214 fitted to the pivotal frame 204. When the elevator table 206 is ascended, the retaining plate 216 is pivoted upward as a bracket 218 fitted to the elevator table 206 is brought into contact with the retaining plate 216 and caused to engage with the retaining bar 214 of the pivotal frame 204 that has been pivoted downward. When the elevator table 206 is descended, on the other hand, the retaining plate 216 is pivoted downward by its own weight because the retaining plate 216 is released from contacting the bracket 281 and also released from engaging with the retaining bar 214.

As above-described in detail, since the hard coating film 28 is formed before the antifogging coating film 26 is formed according to this embodiment of the invention, the presence of the hard coating film 28 can prevent the lens 12 from being scratched even though the backing jig 126 is brought into contact with the outer surface 12b of the lens 12 when the antifogging coating film 26 is formed.

Therefore, according to this embodiment of the invention, the antifogging coating film 26 is formable without scratching the lens 12 even in the case where the antifogging coating film 26 is formed on the inner surface 12a and the hard coating film 28 is formed on the outer surface 12b of the plastic lens 12.

According to this embodiment of the invention, moreover, the following working effect is achievable since the antifogging coating film 26 is formed on the inner surface 12a of the transparent lens body portion 12A.

Figure 6A:
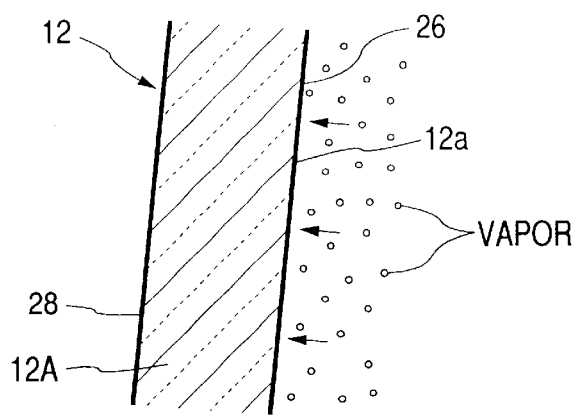
FIGS. 6A, 6B and 6C are detail drawings of a portion VI in FIG. 2, illustrating the significance of antifogging coating film formation.
Figure 6B:
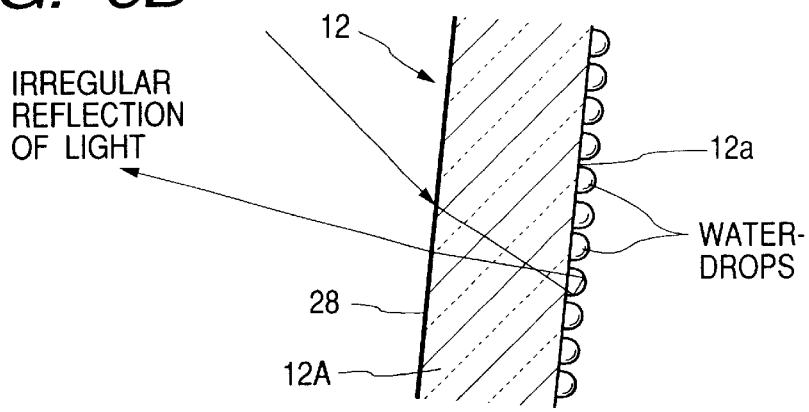
Figure 6C:
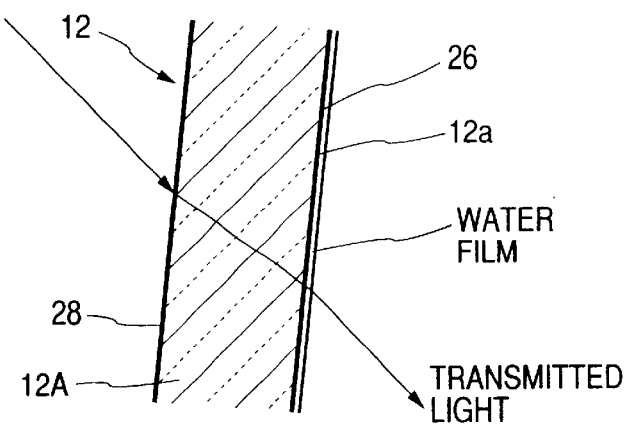

As shown in FIG. 6A which is a detail drawing of a portion VI in FIG. 2, vapor within the lamp chamber condenses on the inner surface 12a of the lens body portion 12A when the temperature in the lamp chamber becomes lower than that on the outside of the lamp chamber. Supposing that the antifogging coating film 26 is not formed on the inner surface 12a of the lens body portion 12A, the vapor that has condensed on the inner surface 12a produces very small waterdrops as shown in FIG. 6B, whereupon these waterdrops results in irregular reflection of light, thus making the inner surface 12a become fogged. In this embodiment of the invention, however, the vapor that has condensed on the inner surface 12a due to the surface-active action turns into a water film because the antifogging coating film 26 is to be formed on the inner surface 12a of the lens body portion 12A as shown in FIG. 6C. Therefore, the transparent state of the lens body portion 12A is maintained, whereby the lens body portion 12A is prevented from looking foggy, that is, looking poor in external appearance and quality.

The formation of the hard coating film 28 on the outer surface 12b of the lens 12 according to this embodiment of the invention can thus improve scratch resistance, weather resistance and solvent resistance of the lens.

According to this embodiment of the invention, the following working effect is achievable since the steps of forming the hard coating film, cooling the film and forming the antifogging coating film are followed within the same clean room 100.

Supposing that the aforementioned steps are followed in entirely different places, the number of physical distribution man-hours would be increased to that extent and while the lens 12 formed with the hard coating film 28 is conveyed up to a place where the antifogging coating film 26 is formed, there is the possibility that the lens 12 may be soiled with dirt or scratched. However, it is possible to reduce the number of physical distribution man-hours and also to prevent the lens from being soiled and scratched during the conveyance of lens by taking the aforementioned process steps within the same cleans room 100.

In the case where the aforementioned steps are followed in different places, the moisture in the air is absorbed by the lens 12 before the antifogging coating film 26 is formed and a whitening phenomenon may occur during the step of forming the antifogging coating film. In other words, since the antifogging coating is hydrophilic, the moisture absorbed into the lens 12 is introduced into the antifogging coating film 26 in the form of waterdrops immediately after the application of the coating and then the moisture in the antifogging coating film 26 is caused to evaporate by heat-drying, so that traces of waterdrops remain to exist. Consequently, there may occur the whitening phenomenon in that the antifogging coating film 26 looks whitish.

On the contrary, performing the whole step mentioned above within the same clean room 100 eliminates the problem of moisture absorption during the conveyance of the lens and thus prevents the whitening phenomenon of the antifogging coating film 26 from occurring.

According to this embodiment of the invention, the following working effect also becomes achievable because the inner surface 12a of the lens 12 is cooled at a temperature of 35° C. or lower up to temperatures higher than the room temperature of the clean room 100 after the hard coating film 28 is formed.

Maintaining the inner surface 12a of the lens 12 at temperatures higher than the room temperature of the clean room 100 makes possible the application of the antifogging coating film 26 while the dried condition of the lens is maintained after the heat-hardening process during the step of forming the hard coating film. It is thus prevented to allow the occurrence of the whitening phenomenon in which the lens absorbs the moisture in the air before the coating is applied. On the other hand, maintaining the inner surface 12a of the lens 12 at 35° C. or higher also prevents the occurrence of unsatisfactory leveling (i.e., a phenomenon in which the antifogging coating film 26 is not uniformly formed over the whole inner surface 12a of the lens body portion 12A because the solvent content in the coating is volatilized previously after the antifogging coating film 26 is applied) caused when the antifogging coating film 26 is applied in the high temperature condition of the inner surface 12a.

According to this embodiment of the invention, further, setting the thickness of the antifogging coating film 26 at 10 $\mu$m or less makes unnecessary the application of the coating a plurality of times and also shortens the coating discharge time, which results in shortening the work time, the time of crosslinking the coating, saving the coating and preventing the coating from dripping.

According to this embodiment of the invention, the following working effect becomes achievable since the time interval between the completion of application of the antifogging coating film 26 and the commencement of the heat-drying process (heat-drying standby time) is shortened stepwise for the purpose of correction in proportion to a rise in humidity within the clean room 100.

Figure 7A:
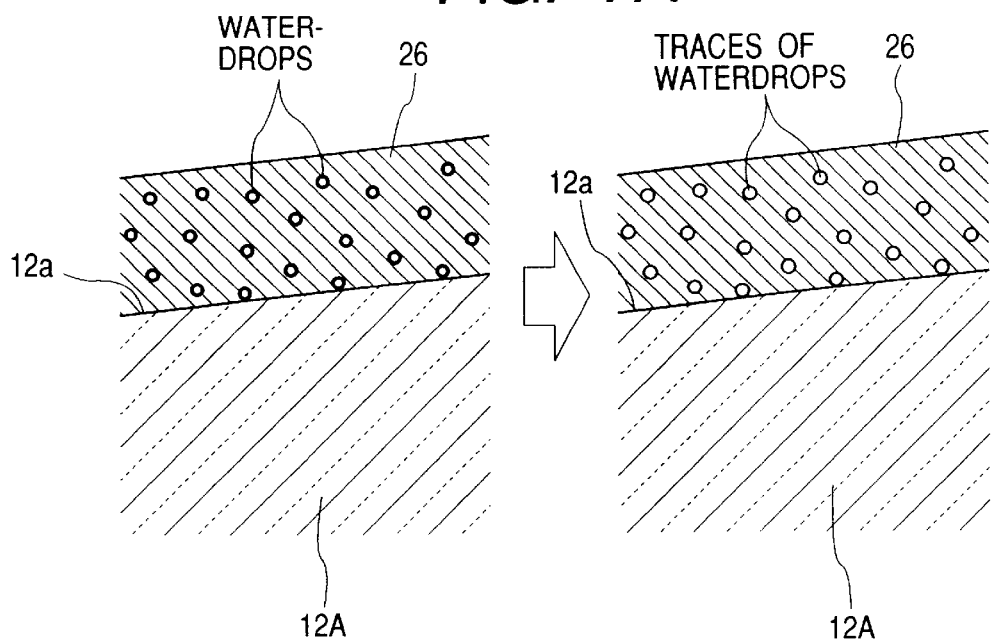
FIGS. 7A and 7B are diagrams illustrating a problem arising from moisture absorption when the antifogging coating film is formed.
Figure 7B:
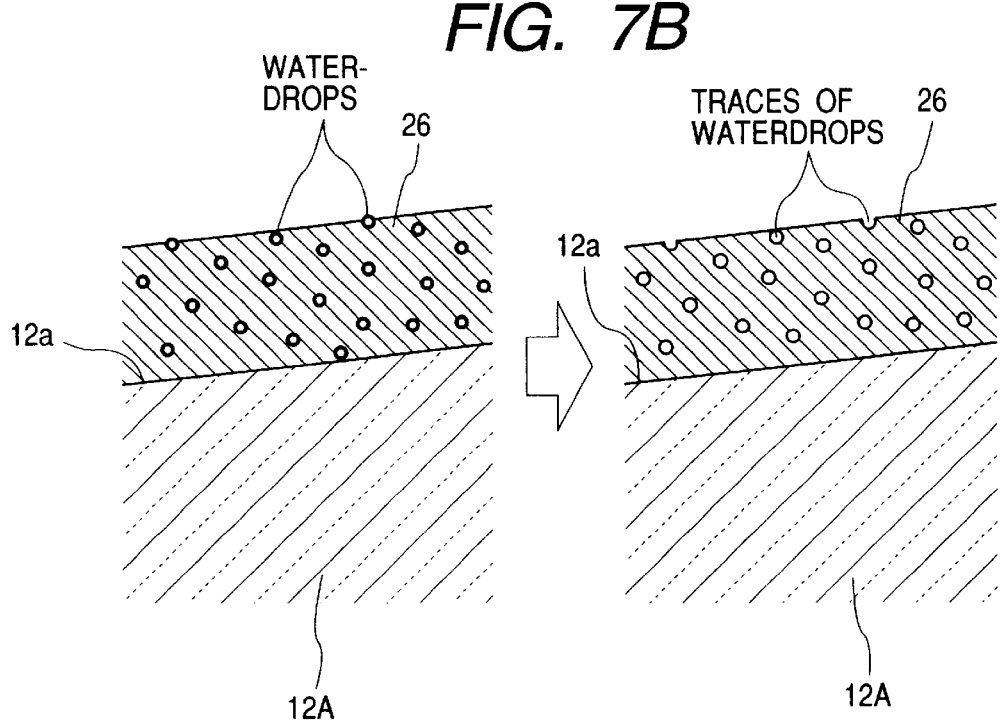
Figure 8:
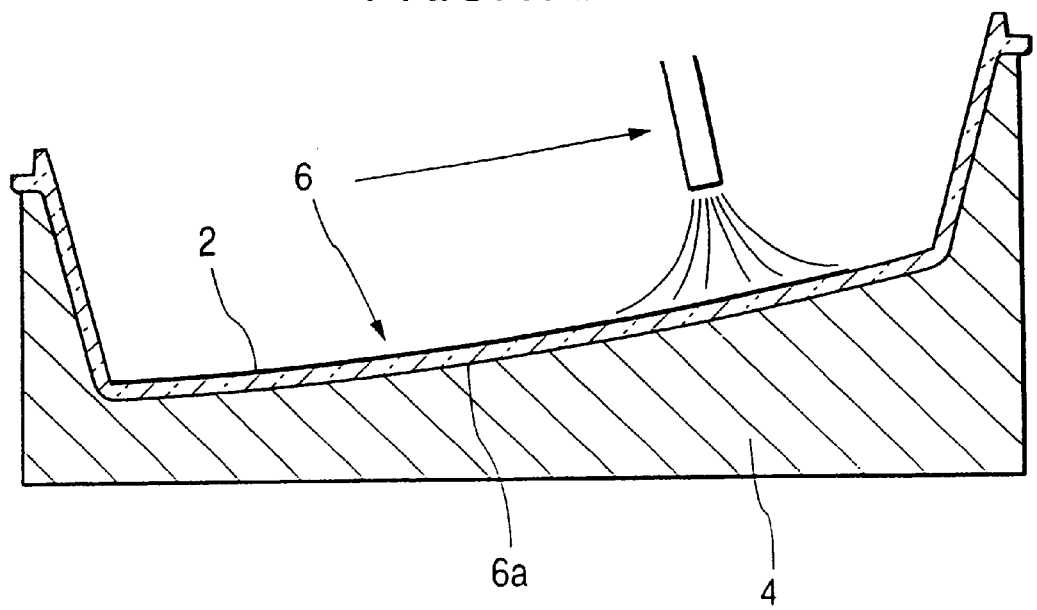
FIG. 8 is a sectional side view of a conventional example similar to FIG. 3B.

If the heat-drying standby time is long, the moisture in the air is absorbed into the antifogging coating film 26 in the form of waterdrops during that time as shown in FIG. 7B and then the moisture in the antifogging coating film 26 is caused to evaporate by heat-drying, so that traces of waterdrops remain to exist. Consequently, there may occur the whitening phenomenon in that the antifogging coating film 26 looks whitish. On the other hand, the heat-drying standby time needs to be preferably somewhat long to uniformly form the antifogging coating film 26.

Therefore, according to this embodiment of the invention, a more uniform antifogging coating film 26 is obtainable without causing the whitening phenomenon by shortening the heat-drying standby time stepwise for the purpose of correction in proportion to a rise in humidity within the clean room 100. (i.e., by securing sufficiently long heat-drying standby time in the atmosphere of low humidity where the moisture in the air is hardly absorbed but shortening the heat-drying standby time in the atmosphere of high humidity where the moisture in the air is readily absorbed.)

According to this embodiment of the invention, the following working effect is achievable since the heat-drying temperature is set at 110–130° C. during the step of forming the antifogging coating film.

If the heat-drying temperature is set at a temperature higher than 130° C., the difference in thermal expansion coefficient between the hard coating film 28 and the lens 12 may cause the hard coating film 28 to crack, whereas if it is set at a temperature lower than 110° C., the antifogging coating film 26 is insufficiently hardened as the coating is not crosslinked, so that its resistance to humidity is not sufficiently secured. However, this situation is preventable from occurring according to this embodiment of the invention.

Although a case where the vehicle lamp 10 is a headlamp has been described in the aforementioned embodiment of the invention, the same working effect as in the embodiment thereof is achievable by adopting the method for surface treatment of the lens in the embodiment thereof even in any other vehicle lamp such as fog and beacon lamps.

While only certain embodiment of the invention has been specifically described herein, it will be apparent that numerous modifications may be made thereto without departing from the spirit and scope of the invention.

The present invention is based on Japanese Patent Application No. Hei. 10-359003 which is incorporated herein by reference.

What is claimed is:

1. A system for treating a lens of a vehicle lamp comprising:

a hard coating booth adapted for spraying a hard coating onto only an outer surface of the lens;

a heating means for heating the lens;

a cooling zone for air cooling the lens such that the temperature of an inner surface of the lens is between room temperature and 35°°C.;

an antifogging coating booth for spraying an antifogging coating onto only the inner surface of the lens; and a masking jig for masking a seal leg portion of the lens, wherein the hard coating booth, the heating means, the cooling zone, and the antifogging coating booth are in the same clean room.

2. The system of claim 1, further comprising a backing jig for masking at least one of an outer surface and an inner surface of the lens during a spraying operation.

\* \* \* \* \*